(12) United States Patent
Tachikawa

(10) Patent No.: US 6,636,951 B1
(45) Date of Patent: Oct. 21, 2003

(54) DATA STORAGE SYSTEM, DATA RELOCATION METHOD AND RECORDING MEDIUM

(75) Inventor: Takashi Tachikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/447,582

(22) Filed: Nov. 23, 1999

(30) Foreign Application Priority Data

Nov. 30, 1998 (JP) ............................................ 10-338307

(51) Int. Cl.$^7$ .............................................. G06F 12/00
(52) U.S. Cl. ........................ 711/154; 711/165; 711/170
(58) Field of Search ................................ 711/154, 165, 711/170, 171, 172, 173

(56) References Cited

U.S. PATENT DOCUMENTS

| | | | | |
|---|---|---|---|---|
| 6,009,537 A | * | 12/1999 | Tanimoto et al. ......... | 360/77.05 |
| 6,237,059 B1 | * | 5/2001 | Dean et al. .................. | 711/100 |
| 6,405,284 B1 | * | 6/2002 | Bridge ........................ | 711/114 |
| 6,438,652 B1 | * | 8/2002 | Jordan et al. ............... | 709/105 |

FOREIGN PATENT DOCUMENTS

| | | |
|---|---|---|
| JP | H5-181717 | 7/1993 |
| JP | H5-265813 | 10/1993 |
| JP | H6-44107 | 2/1994 |
| JP | 7-200369 | 8/1995 |
| JP | H8-106411 | 4/1996 |
| JP | H9-204325 | 8/1997 |

\* cited by examiner

*Primary Examiner*—Donald Sparks
*Assistant Examiner*—C. P. Chace
(74) *Attorney, Agent, or Firm*—Sughrue Mion, PLLC

(57) ABSTRACT

A load estimator supplies, to a controller, a load condition signal corresponding to the current load condition and the estimated load condition of the system. An operational setting storage unit stores an operational setting requirement of the entire system. When the controller determines that the operational requirement meets the operational setting requirement, and the load condition signal meets a predetermined requirement, it reads out, from a relocation program storage unit, an optimum relocation program in association with location information stored in a data location information storage unit, and controls a data relocation unit in accordance with the read relocation program. During a process for relocating data, the controller monitors a predetermined requirement of the suspension (execution of writing, etc., data to a data storage unit). When the requirement of the suspension is fulfilled, the controller terminates the data relocation process processed by the data relocation unit.

18 Claims, 8 Drawing Sheets

DATA STORAGE SYSTEM, DATA RELOCATION METHOD AND RECORDING MEDIUM

BACKGROUND OF THE INVENTION

1. Field of the Invention

The present invention relates to a data storage system, a data relocation method and a recording medium recording programs for executing the method, and more particularly to a technique for determining timing at which data stored in a storage unit is relocated, on the basis of the estimated load condition and/or current load condition.

2. Description of the Related Art

Continuous data, which meaningfully forms a file, may be scattered and stored in a data storage unit such as a magnetic disk unit, etc., on account of various factors in a data storage process. If continuous data is thus scattered and stored in the data storage unit, the problem arises that access efficiency when accessing the continuous data becomes poor.

In order to overcome the above problem, Unexamined Japanese Patent Application KOKAI Publication No. H7-200369 discloses a file system, which secures a blank storage area in order to relocate already-stored data not to be stored after being scattered and store continuous data in continuous areas. This Patent Application also discloses a method for securing continuous blank areas necessary in an operation for transferring a minimum-required file.

However, the above Patent Application does not disclose a method regarding timing at which data is relocated. Thus, in a case where to perform a process of data relocation when a processing load on the system is large, such as a case where to record and reproduce data by means of the method described in the Patent Application, a delay in a process for storing and reproducing data in a data storage device may possibly occur.

Particularly, in a case where to relocate a large volume of data, such as image data, etc. or to simultaneously process plural pieces of data, a delay in the data storage and reproduction process is likely to occur. In a case where to relocate a large volume of data into completely continuous areas, the number of read/write data pieces becomes extremely large. Therefore, the method described in the Patent Application entails a problem that the processing time necessary for data relocation is quite long.

In order to avoid such problems, it is suggested to relocate data when a load on the system is small. However, conventionally, an operator has to make sure whether the load on the system is small and instruct a process of data relocation when determined that the load on the system is small, resulting in so many tasks for the operator.

SUMMARY OF THE INVENTION

An object of the present invention is to provide a data storage system, a data relocation method and a computer readable recording medium, which records programs for realizing the data storage system, all of which perform a process of data relocation with efficiency, by determining timing at which data is relocated based on a condition of the estimated load and/or the current load of the system.

In order to achieve the above object, according to the first aspect of the present invention, there is provided a data storage system comprising:

a data storage unit which has a data storage area divided into a plurality of blocks and which stores data in the data storage area in unit of blocks;

a main memory unit which has a program area and a data area; and a processing unit which executes programs stored in the main memory unit, wherein the main memory unit stores, in the data area, location information which represents in which block the data is located and stored in the data storage area of the data storage unit, and stores, in the program area, a relocation program for relocating the data stored in each block of the data storage area in the data storage unit by referring to the location information which is stored in the data area, a load condition output program for outputting a load condition signal indicating a load on a system resource including the data storage unit and a control program for controlling whether to execute the relocation program in accordance with the output load condition signal, and the processing unit monitors the load condition signal which is output when executing the load condition signal output program, by executing the control program stored in the program area, and executes the relocation program which is stored in the program area, based on a monitored result of the load condition signal.

In the above-described data storage system, a process for relocating the data stored in the data storage unit is executed in accordance with the load condition signal which indicates a load on a predetermined system resource. Therefore, in a time slot in which the load condition signal being monitored by the execution of the control program indicates that the load on the system resource is relatively small, the relocation program is executed so that the data stored in each block of the data storage unit can be relocated. As a result of the above, the data can be relocated with efficiency.

Different processing units may be prepared for respectively executing the control program, the load condition signal output program and the relocation program. In this case, an instruction for executing the load condition signal or the relocation program is transmitted as a message between the processing units. The main memory unit may be arranged in each processing unit. The system may include a plurality of processing units or main memory units, without departing from the scope of the present invention.

In the data storage system according to the first aspect of the invention, the data storage unit may include an area for storing location information indicating in which block the data in the data storage area is located and stored. In this case, the control program is one for transferring the location information stored in the data storage unit into the data area of the main memory unit, when executing the relocation program.

In the data storage system according to the first aspect of the invention, the main memory unit further stores operational setting requirements of the system in the data area. In this case, the control program includes an operational setting requirement determination program for determining whether a operating condition of the system meets a stored operational setting requirement, and controls execution of the relocation program in accordance with a determined result processed by the operational setting requirement determination program.

In this case, if a time slot in which a noise may possibly annoy people is set as an operational setting requirement in order to restrict the data relocation program to perform the data relocation, for example, the data can be relocated at timing at which a load on the system resource is low, while taking effects on the environment into consideration.

The data storage system according to the first aspect of the invention may further comprise a relocation program storage unit which stores a plurality of relocation programs. In this case,.

the control program includes a relocation program selection program for selecting either one of relocation programs stored in the relocation program storage unit, when performing data relocation, and for starting the relocation program which has been selected by the relocation program selection program.

The relocation program storage unit may be realized by one or more than one data storage area included in the data storage unit.

The relocation program selection program may be used for selecting either one of relocation programs from the relocation program storage unit, in accordance with the location information store in the data area.

The relocation program selection program may be used for selecting either one of relocation programs from the relocation program storage unit, in accordance with the output load condition signal.

For example, in a case where the load on the system resource is relatively small so that the data relocation process can be performed for a long time, the data stored in the data storage unit can be relocated in such a way that identical data are located in continuous block of the data storage area. In such a case, the speed at which the following data is read out can be accelerated. On the other hand, in a case where the time for the data relocation process is relatively short, for example, the data can be relocated in such a way that the data corresponding to 6 blocks are scattered in two parts, respectively and continuously in the unit of 3 blocks.

In the data storage system according to the first aspect of the invention, the load condition signal output program includes a load condition monitoring program for monitoring a current load condition on a system resource, and is used for outputting a load condition signal in accordance with the load condition monitored by executing the load condition monitoring program.

Accordingly, when the load on the system resource is high, the data relocation program is not executed, and when the load on the system resource is low, the processing unit is controlled to relocate the data and the load condition signal is output.

In the data storage system according to the first aspect of the invention, the load condition signal output program includes a load condition monitoring program for monitoring the load condition on the system resource and a load condition learning program for learning the load condition monitored by execution of the load condition monitoring program and for storing the learned result as load condition estimation, and outputs a load condition signal in accordance with the load condition estimation stored by estimation of the load condition program.

By thus learning the load condition and storing the learned data as load condition estimation, the load condition signal can be output in order not to execute the data relocation program, in a case where it is estimated that the load on the system is to be high based on usage conditions representing general usage times of the system by the user.

In the data storage system according to the first aspect of the invention, the processing unit may execute a program in accordance with a priority order of a task. In this case, it is preferred that a priority order of a task regarding execution of the control program is set equal to or lower than a priority order of any other processes.

In this case, when the load on the system resource such as the processing unit or the like is high, almost no system resource is allocated to a task which is carried out by the control program whose priority order is low. Thus, execution of any other tasks which are executed in a higher priority order can not be interrupted by the execution of the control program. In a time slot in which the load on the system resource is high, it is not necessary to relocate the data stored in the data storage unit. That is, there is no need for the processing unit to execute the control program, therefore, no troubles may be considered.

The data storage system according to the first aspect of the invention may comprise a plurality of data storage units each of which stores data in the data storage area in the unit of blocks and each of which has a data storage area divided into a plurality of blocks. In this case, the main memory units stores, in the data area, location information regarding each of the plurality of data storage units.

The plurality of data storage units may be identical or may differ from each other.

The relocation program may relocate data which is stored in each of the blocks of the data storage area in the unit of respective data storage units.

The relocation program may relocate the data stored in each block of the data storage area in the unit of a group of two data storage units.

In this case, it is preferred that the relocation program may relocate continuous data in such a way that the data is stored over two or more than two data storage units.

In order to achieve the above-described object, according to the second aspect of the present invention, there is provided a data storage system comprising:

data storage means, including a data storage area divided into a plurality of blocks, for storing data in the data storage area in unit of blocks;

location information storage means for storing location information representing in which block the data is located and stored in the data storage area of the data storage means;

data relocation means for relocating the data stored in each block of the data storage area of the data storage means by referring to the location information stored in the relocation information storage means;

load condition signal outputting means for outputting a load condition signal which indicates a load on a predetermined system resource including the data storage means; and control means for controlling the data relocation means in accordance with the load condition signal output from the load condition signal outputting means.

The data storage system according to the second aspect of the invention further comprises:

operational setting requirement storage means for storing an operational setting requirement of the system comprising each of the means; and operational setting requirement determination means for determining whether a operating condition of the system meets an operational setting requirement stored in the operational setting requirement storage means. In this case, the control means may control the data relocation means in accordance with a determined result processed by the operational setting requirement determination means.

The data storage system according to the second aspect of the invention may further comprise:
  relocation method storage means for storing a plurality of data relocation methods capable of relocating data by the data relocation means; and
  relocation method selection means for selecting and transmitting either one of relocation methods from the relocation method storage means to the data relocation means. In this case,
  the data relocation means relocates data in accordance with the relocation method which has been transmitted from the relocation method selection means.

In order to achieve the above-described object, according to the third aspect of the invention, there is provided a data relocation method for relocating data stored in a data storage unit including a data storage area divided into a plurality of blocks, in accordance with location information indicating a location of the data in the data storage area, wherein the method
  monitors a load condition signal indicating a load on a predetermined system resource including the data storage unit, and
  relocates data which is stored in each block of the data storage area of the data storage unit, in accordance with a monitored result of the load condition signal, by referring to the location information.

In order to achieve the above-described object, according to the fourth aspect of the invention, there is provided a computer readable recording medium which records programs for relocating data which is stored in a data storage unit including a data storage area divided into a plurality of blocks, in accordance with location information indicating a location of the data in the data storage area, the programs realizing on a computer:
  a load condition signal monitoring function for monitoring a load condition signal which indicates a load on a predetermined system resource including the data storage unit; and
  a data relocation function for referring the location information and for relocating the data stored in each block of the data storage area of the data storage unit, in accordance with a monitored result of the load condition signal which is processed by the load condition signal monitoring function.

In order to achieve the above-described object, according to the fifth aspect of the invention, there is provided a program embodied in a carrier wave, for relocating data stored in a data storage unit including a data storage area divided into a plurality of blocks in accordance with location information which indicates a location of the data in the data storage area, the program realizing on a computer a load condition signal monitoring function for monitoring a load condition signal which indicates a load on a predetermined system resource including the data storage unit; and
  a data relocation function for referring to the location information and relocating the data stored in each block of the data storage area of the data storage unit, in accordance with a monitored result of the load condition signal which is processed by the load condition signal monitoring function.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENT

Preferred embodiments of the present invention will now be explained with reference to the accompanying drawings.

[First Embodiment]

Figure 1:
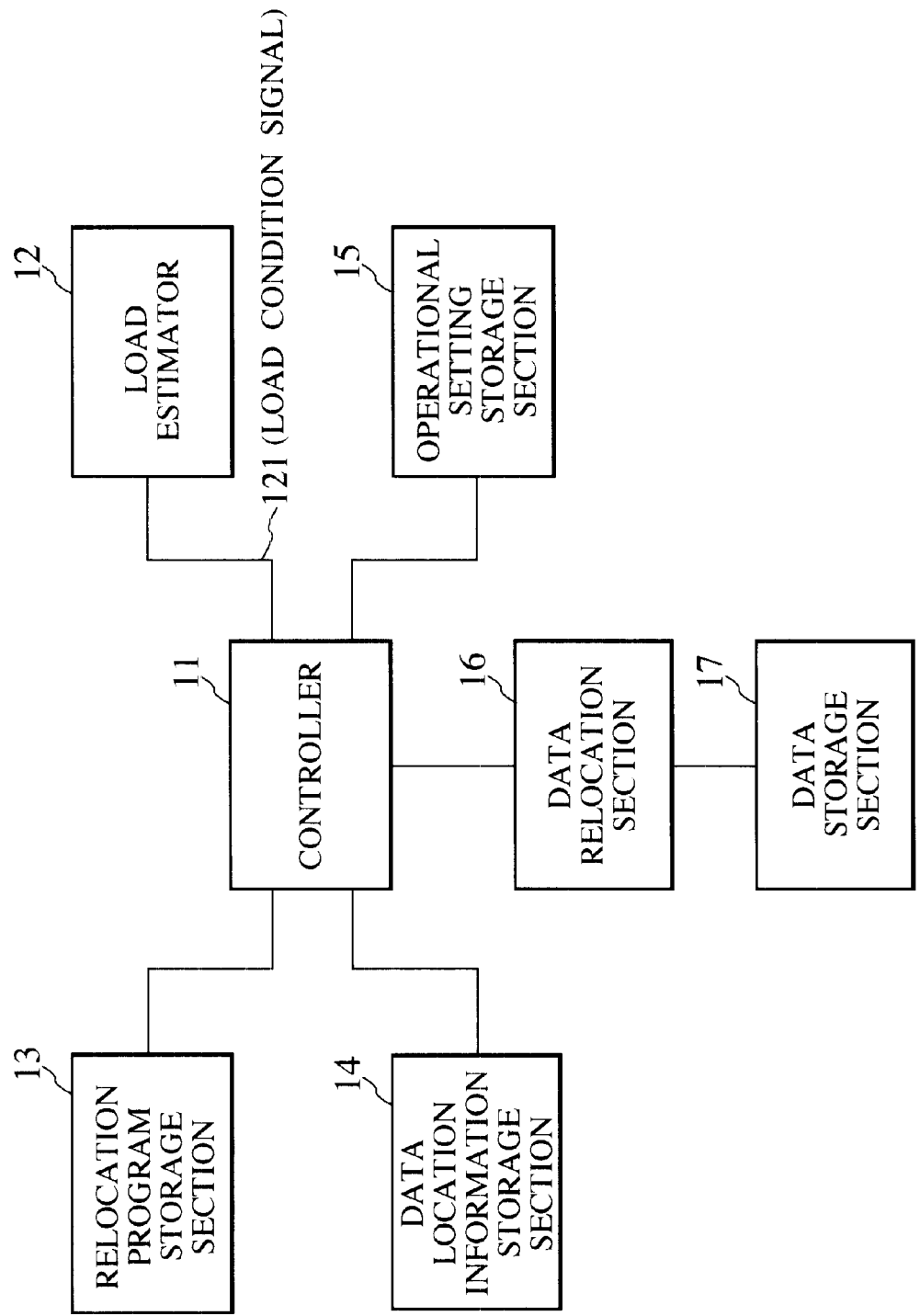
FIG. 1 is a block diagram showing the functional structure of a data storage system according to the first embodiment of the present invention.

FIG. 1 is a block diagram showing the functional structure of a data storage system according to the first embodiment. As shown in FIG. 1, the data storage system includes a controller 11, a load estimator 12, a relocation program storage section 13, a data location information storage section 14, an operational setting storage section 15, a data relocation section 16 and a data storage section 17.

The controller 11 supports a multiprogramming function for parallelly carrying out a plurality of tasks. In order to realize the multiprogramming function, the controller 11 includes an Operating System (OS) which performs context switching in a round-robin fashion.

The controller 11 receives, from the load estimator 12, a load condition signal 121 which represents the current load conditions and/or the estimated load conditions of the system. The controller 11 refers to the relocation program storage section 13, the data location information storage section 14 and the operational setting storage section 15. The relocation program storage section 13 stores programs used when controlling the data relocation section 16. The data location information storage section 14 stores information representing the location of the data stored in the data storage section 17. The operational setting storage section 15 stores operational settings of the entire system.

The controller 11 has a function for controlling the data relocation section 16, selects and reads out an optimum relocation program according to data location information from the relocation program storage section 13 when a predetermined requirement is fulfilled, thereafter providing the data relocation section 16 with the read program. The controller 11 is connected to the data storage section 17 via a data read/write section (not illustrated), and accesses the data storage section 17 via the data read/write section when carrying out processes except the process of relocating data.

The load estimator 12 includes a function for monitoring the current load conditions of a system (including the data storage section 17, etc.) and a function for estimating the load conditions of the system within a predetermined period of time from the present time, and sends a load condition signal 121 representing the current load conditions or the estimated load conditions to the controller 11. The method for estimating the load on the system, as performed by the load estimator 12, may be stored in the operational setting section 15. This method may be set in accordance with the user determination or by the host computer based on general usage times of the system and estimated usage conditions. The load estimator 12 may learn the load conditions of the system when being used, and may estimate the load on the system in accordance with the learned result.

The relocation program storage section 13 stores various types of relocation programs used when the data relocation section 16 relocates the data stored in the data storage section 17. Either one of the relocation programs stored in the relocation program storage section 13 is read out by the controller 11, when a predetermined requirement is fulfilled, and is sent to the data relocation section 16.

The data location information storage section 14 stores data location information representing where the data stored in the data storage section 17 is stored on a medium. The data location information is created based on, for example, file management information which is retrieved by the controller 11 from the data storage section 17 when the controller 11 accesses the data storage section 17 via the data read/write section, and is written in the data location information storage section 14. When the process of relocating the data is completed, the location information of the data after relocated is written in the data location information storage section 14.

The operation setting storage section 15 stores various operational setting requirements of the system when operating the entire sections and performing the data relocation process, and is connected to the controller 11 so that the controller 11 can retrieve the operational setting requirements.

The data relocation section 16 is controlled by the controller 11 whether to be activated or inactivated. When the data relocation section 16 is operated in accordance with the relocation program sent from the controller 11, it performs a process for relocating the data stored in the data storage section 17. After the process of relocating the data is competed, the data relocation section 16 sends information representing the completion of the process to the controller 11.

The data storage section 17 has a data storage area for storing data in the unit of blocks. The data written in each block is managed in accordance with the file management information. By managing the data in accordance with the file management information, a location of the data is easily found out. Therefore, continuous data forming a file can be scattered and written in the data storage section 17. The data thus scattered and stored in the data storage section 17 is relocated by the data relocation section 16 in a manner described later.

Figure 2:
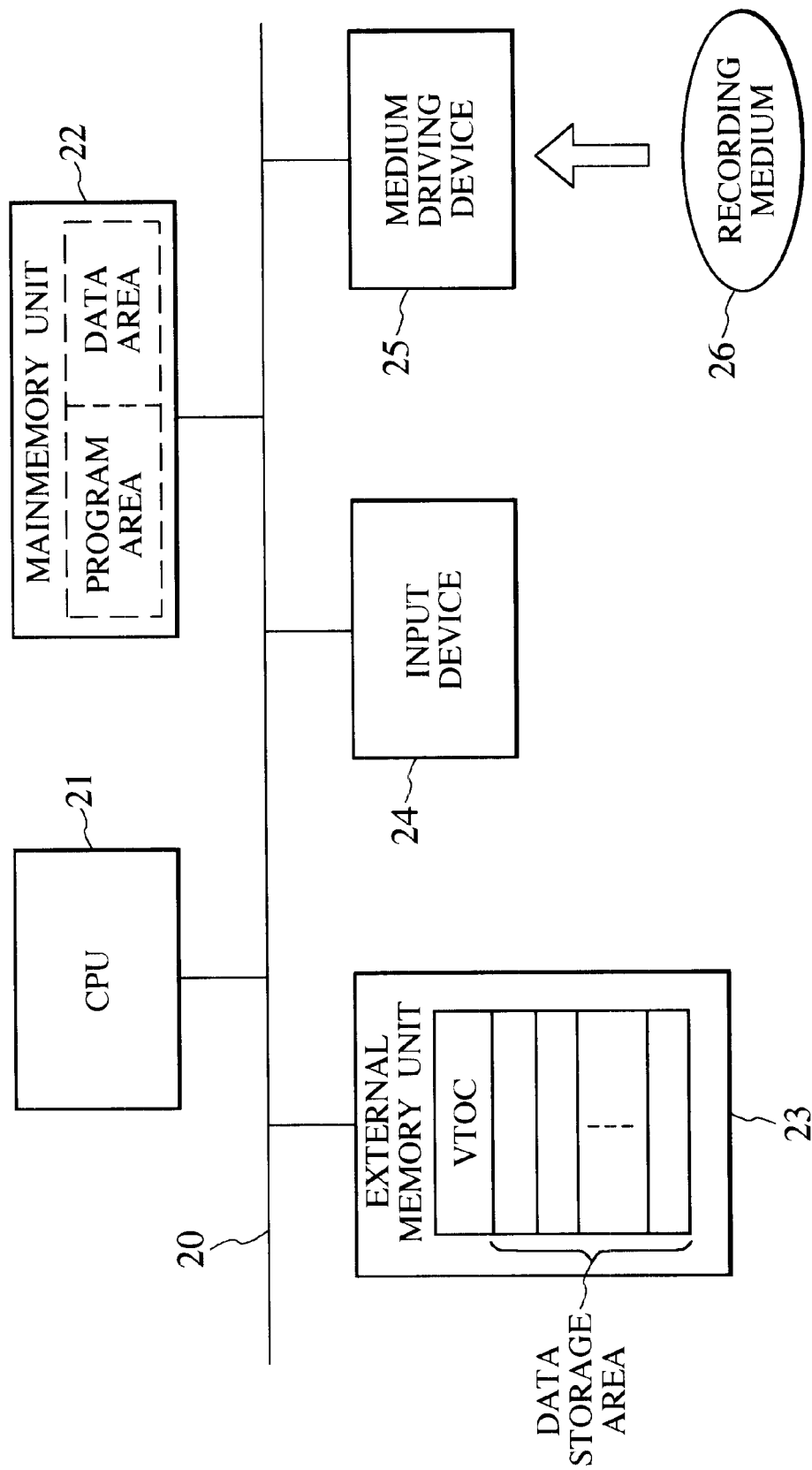
FIG. 2 is a block diagram exemplifying a computer system in which the data storage system shown in FIG. 1 is realized.

FIG. 2 is a block diagram illustrating the structure of a computer system in which the data storage system shown in FIG. 1 is realized. As illustrated in FIG. 2, the computer system comprises a CPU (Central Processing Unit) 21, a main memory unit 22, an external memory unit 23, an input device 24, a medium driving device 25 and a recording medium 26 having a structure for being attached and removed to and from the medium driving device 25, all of which are connected with each other via a bus 20.

The CPU 21 executes a program which is stored in a program area of the main memory unit 22. By executing the program, the CPU 21 realizes functions of the above-described controller 1, load estimator 12 and data relocation section 16. In addition, the CPU 21 changes one task to another in accordance with the Operating System, and controls an execution order in which the programs are executed in sequential order.

The main memory unit 22 is composed of a semiconductor RAM (Random Access Memory), and has the program area and a data area. The data area is one for storing location information based on the file management information which is stored in the external memory unit 23 and various operational setting requirements of the system which are transferred from the external memory unit 23, whereby realizing the data location information storage section 14 and the operational setting storage section 15.

The program area is one for storing a control program, a load estimation program and a relocation program for realizing the above-described controller 11, the load estimator 12 and the data relocation section 16. The control program is always stored in the program area, and the load estimation program may or may not be stored in the program area, whereas the relocation program is so selected in accordance with the control program as to be stored therein. The Operating System which performs context switching in a round-robin fashion is also stored in the program area.

The external memory unit 23 is composed of a magnetic disk unit, a magneto-optical disk unit, etc., and has a data storage area for storing data in the unit of blocks and an area for storing file management information such as VTOC (Volume Table Of Contents), thereby realizing the above-described data storage section 17. The external memory unit 23 includes a read/write head for realizing a part of the data relocation section 16.

The various settings of the system, the load estimation program and the plurality of relocation programs which can be selected in accordance with the control program may be stored in one or more than one data storage area in the external memory unit 23, and may be stored likewise on any other type of medium such as a flash memory, ROM (Read Only Memory) or the like. In the case where the external memory unit 23 stores the plurality of relocation programs, a corresponding data storage area becomes one for realizing the relocation program storage section 13.

The input device 24 is used for inputting various settings of the system in order to realize the operational setting storage section 15, and in some case it is used for inputting data representing the load estimation in order to realize the load estimator 12.

Under the control of the CPU 21, the medium driving device 25 reads out programs and/or data from the computer readable recording medium 26 such as. CD-ROM, etc., and transfers the read programs and/or data to the main memory unit 22 or the external memory unit 23. The recording medium 26 records, the control program, the load estimation program and the plurality of relocation programs.

The process of relocating data which is performed in the data storage system of this embodiment will now be explained. An explanation will now be made on the basis of the functional block diagram illustrated in FIG. 1.

First, in order to perform the process of relocating data, a process which is carried out by the controller 11 will now be explained with reference to the flowchart shown in FIG. 3. When a time slice is allocated to a task of the flowchart in a round-robin fashion and when the CPU 21 or other system resources are prepared for realizing the controller 11, the process of the flowchart shown in FIG. 3 begins. When an allocated time slice expires, the task is suspended for a certain period of time. Then, If a time slice is allocated to the suspended task again, the data relocation process is restarted from the point which has been suspended before.

The controller 11 determines whether or not an operational state of the system meets various operational setting requirements which are stored in the operational setting storage section 15 (Step S1). If the state does not meet the requirements, the controller 11 repeats the determination until the requirements are fulfilled.

In the case where the sate meets the requirements, the controller 11 determines whether the current load conditions or the estimated load conditions of the system meet the load requirement for performing the process of relocating data, in accordance with the load condition signal sent from the load estimator 12 (Step S2). The load requirement of this case, which is set in advance, is that the current load value of the system is equal to or less than a first predetermined load value and the estimated load value of the system is equal to or less than a second predetermined load value, for example.

In a case where the operational setting requirement and the load requirement are both fulfilled, the controller 11 selects and reads out a relocation program from the plurality of relocation programs stored in the relocation program storage section 13 (Step S3). The controller 11 may select an optimum relocation program simply in accordance with the operational setting requirement, dynamically in accordance with the current or estimated load requirement of the system, or in accordance with the location information stored in the data location information storage section 14.

The controller 11 provides the data relocation section 16 with the selected relocation program, and sends predetermined information to the data relocation section 16, thereby controlling the data relocation section 16 to start relocating the data stored in the data storage section 17 (Step S4). A method of relocating data, stored in the data storage section 17, which the data relocation section 16 executes will be explained later.

When the data relocation section 16 starts the process of relocating data, the controller 11 determines whether the operational state of the system meets a certain requirement of suspension (Step S5). In this case, the requirement of the suspension is that, for example, the load value of the system (accessing the data storage section 17 through the data read/write section from the controller 11) exceeds a third predetermined load value, or the task is processed within a predetermined time period before the expiration of the time slice (sufficiently enough time for terminating the task, as will be explained later).

In a case where the requirement of the suspension is fulfilled in Step S5, the controller 11 performs a termination process (Step S7), which will be explained later, then the process of the flowchart ends. On the other hand, in a case where the requirement of the suspension is not fulfilled in Step S5, the controller 11 determines whether or not the process for relocating the data has been completed, on the basis of the information representing the completion of the process which is sent from the data relocation section 16 (Step S6).

In the case where the process for relocating the data is completed as determined in Step S6, the controller 11 performs the termination process (Step S7), which will be explained later, and then the process of the flowchart terminates. On the other hand, in a case where the process for relocating the data is not completed, the controller 11 returns to Step S5 in order to repeat the determination. In the flowchart, Steps S1 and S2 may be switched from one to the other, or they may be combined or the controller may perform the determination with further specific steps, and likewise Steps S5 and S6.

An explanation will be made to the termination process in Step 7, in which the controller 11 sends an instruction to suspend the data relocation process to the data relocation section 16, when the termination process is started in accordance with the determination of whether the requirement is fulfilled, as performed in Step S5. The data relocation section 16 suspends the data relocation process at the point where the data is relocated in a current block. The controller 11 acquires, from the data storage section 17, file management information such as VTOC, etc., at that time of suspending the data relocation process. The controller 11 then updates the location information stored in the data location information storage section 14 based on the acquired file management information. In a case where the termination process is started in accordance with the determination performed in Step S6, the controller 11 performs only procedures for acquiring the file management information and for updating the location information.

An explanation will now be made to a process which is carried out by the data relocation section 16 in order to relocate the data stored in the data storage section 17. The data relocation section 16 sequentially performs relocating data in such a way that continuous data forming a file is stored in continuous areas of the data storage section 17 through the utilization of certain blank areas, in accordance with the relocation program sent from the controller 11. Every time the process for relocating the data in one block is completed, the data relocation section 16 updates the file management information.

In a case where a signal for suspending the procedure is transmitted from the controller 11, the data relocation section 16 once suspends the relocation process, after relocating the data in the currently-relocated block is completed. In a case where the process for relocating the data in accordance with the relocation program received from the controller 11 is completed, the data relocation section 16 sends the information representing the completion of the process to the controller 11.

The structure of the data storage system and operations for relocating the data in the data storage system in this embodiment will now be specifically explained with some examples. An explanation will now be made on the basis of the functional block diagram shown in FIG. 1.

Specific examples of a method, in which the load estimator 12 outputs the load condition signal 121, will now be explained.

First, an explanation will be made to an example, in which the load estimator 12 outputs the load condition signal 121 in accordance with the current load on the system resource. In a case where a large amount of data are simultaneously read out from the data storage section 17 for a short period of time, for example, when to record and reproduce image data, the load estimator 12 determines the load at the present time in order to output the load condition signal 121 indicating that the load on the system is large. Furthermore, in a case where to-be-read data has been already stored in a buffer, the load estimator 12 can output the load condition signal 121 indicating a high/low load in accordance with the remaining time available before the next reading operation.

Next, an explanation will be made to an example in which the load estimator 12 estimates a load and outputs a load condition signal 121. The load estimator 12 monitors the load condition of the system including the data storage section 17 at given intervals (for example, every minute) and records the monitored load condition in a predetermined area of the memory. The load estimator 12 obtains a mean value of the recorded load condition, in terms of a month period, a week period or a day period, so that it becomes possible to learn the load on the system in accordance with the general usage condition of the user. As a result of the learning, the load estimator 12 obtains data in association with the time, which is shown in the form of a graph illustrated in FIG. 4A.

Figure 4:
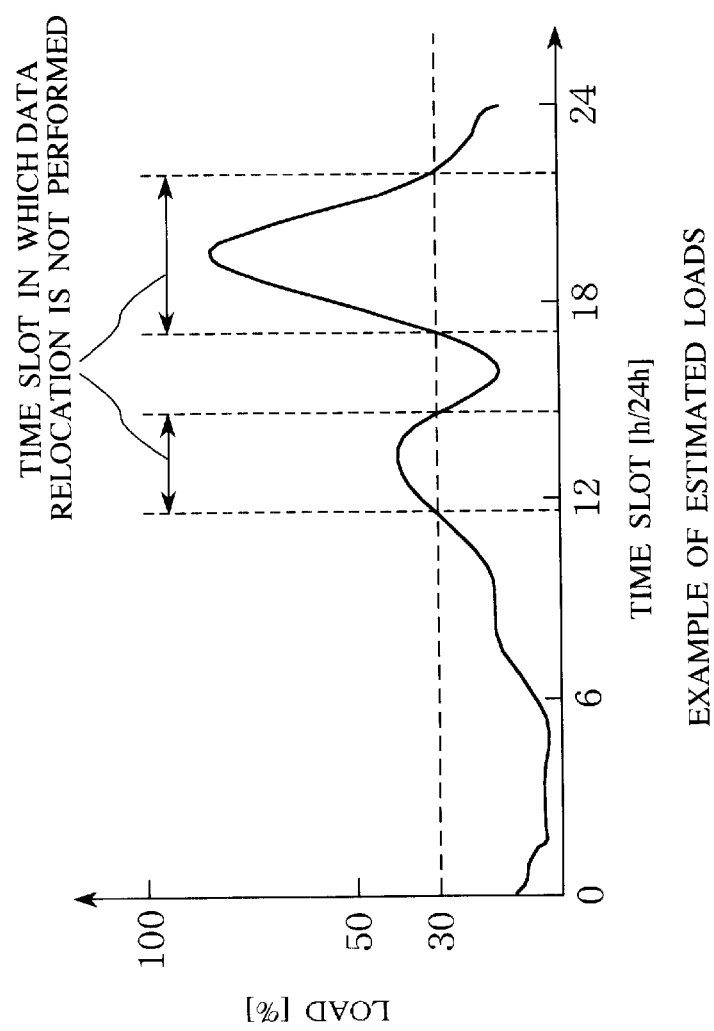
FIG. 4A is a diagram showing estimated load conditions which are employed in an example of the first embodiment of the present invention.
FIG. 4B is a diagram showing operational setting requirements employed in the example.

As illustrated in FIG. 4A, the load estimator 12 sets a time slot in which the load on the system resources is equal to or greater than a certain value (for example, equal to or greater than 30%), as a time slot in which the estimated load on system is high. The load estimator 12 outputs and sends a load condition signal 121 to the controller 11.

In the time slot in which high-load operations, for example, when recording a large amount of data are processed, the load in the above time slot is weighted, so that it becomes possible to learn the estimated load condition. Moreover, the load estimator 12 can set a time slot in which a recording and reproducing processes are to be performed as a result of the user setting, as a time slot in which the load conditions on system is very high.

Next, a specific example of an operational setting requirement which is stored in the operational setting section 15 will now be explained. For example, as an operational setting requirement, as illustrated in FIG. 4B, a period of 24 hours of a day is divided into every few hours of time slots. Then, one or more than one of the time slots for performing the relocation process and a particular date for performing the same can be set. The operational setting requirement is thus set in the operational setting section 15, thereafter, for example, in a late-night time slot, etc., in which a noise can easily annoy people, the process of data relocation can be so controlled as not to be performed. For a system to which a power source is always supplied, by setting the operational setting requirement, the process of data relocation can be performed in a time slot in which the system is not usually operated.

A specific example of a method (which is determined in accordance with the relocation program which the controller 11 has selected from the ones stored in the relocation program storage section 13) for relocating data which is stored in the data storage section 17 will now be explained.

Figure 5:
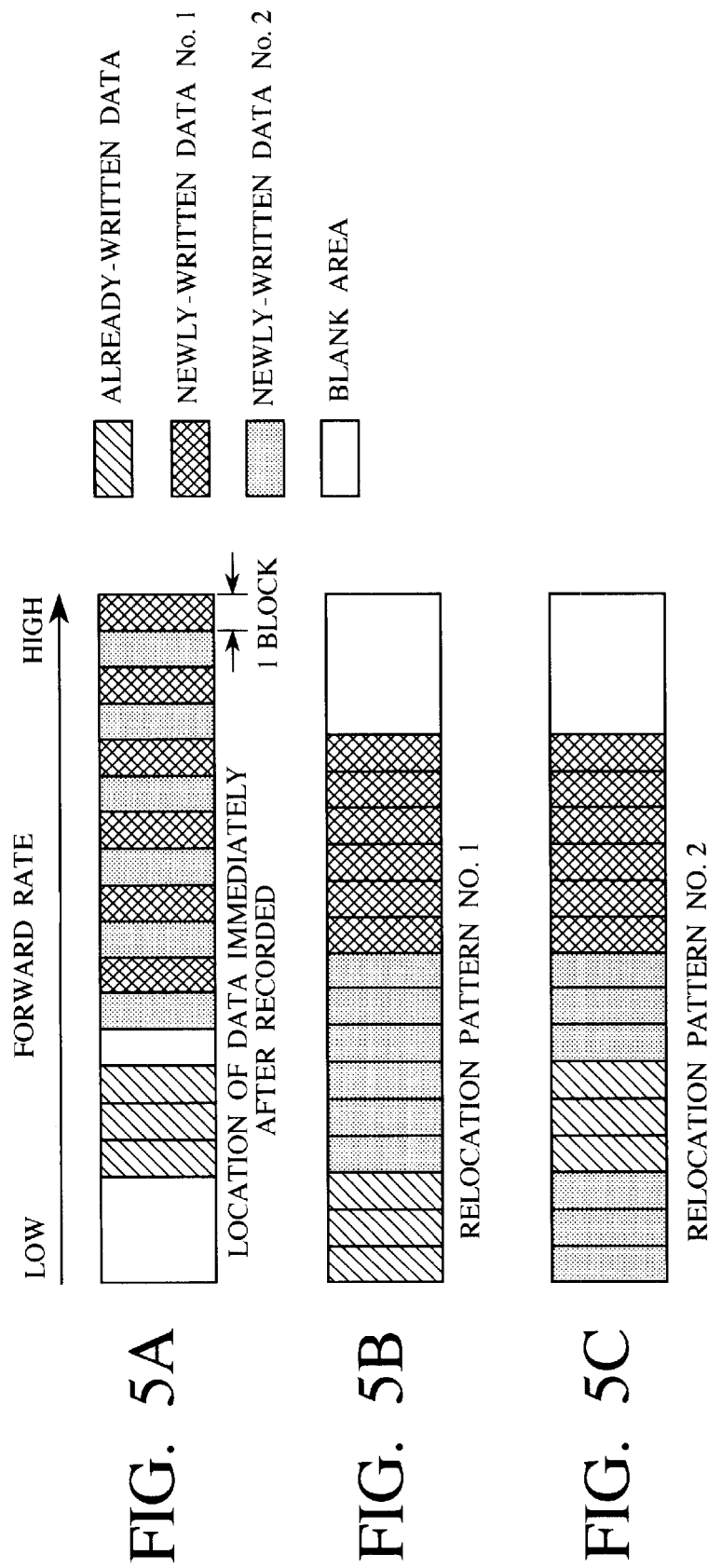
FIGS. 5A to 5C are diagrams each showing an example of data relocation in the example of the first embodiment of the present invention.

It should be assumed that the system before performing the process of data relocation is in a state where continuous data (including data No. 1 and data No. 2) are not written in continuous areas of the data storage section 17 but are scattered and written in a manner described in FIG. 5A. Such a data location state is stored in the data location information storage section 14. This occurs, for example, when a large amount of image data are parallelly stored in the data storage section 17.

As a method for relocating the data in such a case, as illustrated in FIG. 5B, there is a method for relocating data forming a file in continuous areas of the data storage section 17. In this case, if the data storage section 17 performs a seek operation as a magnetic disk unit does, the data (including data No. 1 and data No. 2) are relocated on the portion (on the left-hand side of diagrams shown in FIGS. 5A to 5C) such as the internal circumference of the disk whose forward rate is low. It is preferred that the portion (on the right-hand side of diagrams shown in FIGS. 5A to 5C) such as the outer circumference of the disk whose forward rate is high is blank, thus the data can be recorded therein.

In doing this, when read/write instructions of the large amount of data (including data No. 1, data No. 2 and other existing data) are simultaneously generated, a seek operation necessary for reading one kind of data is easily performed. Thus, by relocating the data as shown in FIG. 5B, an error can be prevented from occurring as a result of the low operational speed, when the data reading unit reads/writes data from the data storage section 17.

As the process of relocating data, there is a method, in which a processing speed when to read/write data after the data relocation and the time needed for the process of data relocation are considered. In employing such a method, an example in which the process of data relocation is performed in a state shown in FIG. 5A is illustrated in the example of FIG. C.

In this case, the data No. 2 (for 6 blocks) as a whole is not simply relocated in continuous areas, however, it is scattered in two parts, continuously in three blocks each, in order to be relocated in the data storage section 17. Even in this case, when the data reading unit reads/writes the data No. 2, the seek operation is not likely performed compared to the state shown in FIG. 5A, thus the time required for reading and writing data can be shorter.

In a case where the data is relocated as to be in a state shown in FIG. 5C, other existing data is not necessarily moved in its position from that shown in FIG. 5A. Thus, the time required for relocating the data can become shorter compared to the case where the data is relocated while the existing data is moved in its position as shown in FIG. 5B. Even in the case where the data is relocated by the aforementioned method, it is preferred that the scattered data are located in such a way that a waiting time before a process of reading the following data, such as the seek operation, head switching operation or the like becomes short as much as possible.

As explained above, in the data storage system according to this embodiment, when the load condition signal 121 indicates that the current load and the estimated load are low, the controller 11 controls the data relocation section 16 to relocate the data stored in the data storage section 17. Therefore, the process of data relocation can be performed when the load on the system resource including the data storage section 17 is low.

Furthermore, in the data storage system according to this embodiment, the controller 11 controls the data stored in the data relocation section 16 to be relocated in accordance with the operational setting requirements of the system which is stored in the operational setting storage section 15. As one of the operational setting requirements of the system, when the time slot in which a noise may possibly annoy people is set as a time slot in which the data can not be relocated, the data stored in the data storage section 17 can be relocated while taking effects on the environment into consideration.

When controlling the data to be relocated, the controller 11 selects and reads an optimum relocation program from the relocation program storage section 13, and provides the data relocation section 16 with the read program. Therefore, for example, when the load on the system resource is small enough for the system to perform further operations, the system relocates the data stored in the data storage section 17 so that the data are located in continuous blocks, without being scattered, and can accelerate the speed at which the data is read next time.

In a case where the time prepared for relocating the data is not long as a result of the load on the system, the data relocation section 16 may, for example, control the data in six blocks to be scattered in two parts, continuously in three blocks each, in accordance with the selected relocation program. Similarly, in this manner, the relocated data can be read from the data storage section 17 at higher speed compared to the speed at which data before relocated is read, therefore, the process for relocating the data can be completed within a period of time in accordance with the load on the system resource.

The load estimator 12 has a function for monitoring the current load condition of the system and a function for estimating the load condition of the system based on the learning of the monitored load condition. The load estimation signal 121 which the load estimator 12 outputs is to indicate the conditions of the current and estimated load. Therefore, in the case where both of the current and estimated loads are low, the data relocation section 16 can perform the process for relocating the data which is stored in the data storage section 17.

[Second Embodiment]

Figure 6:
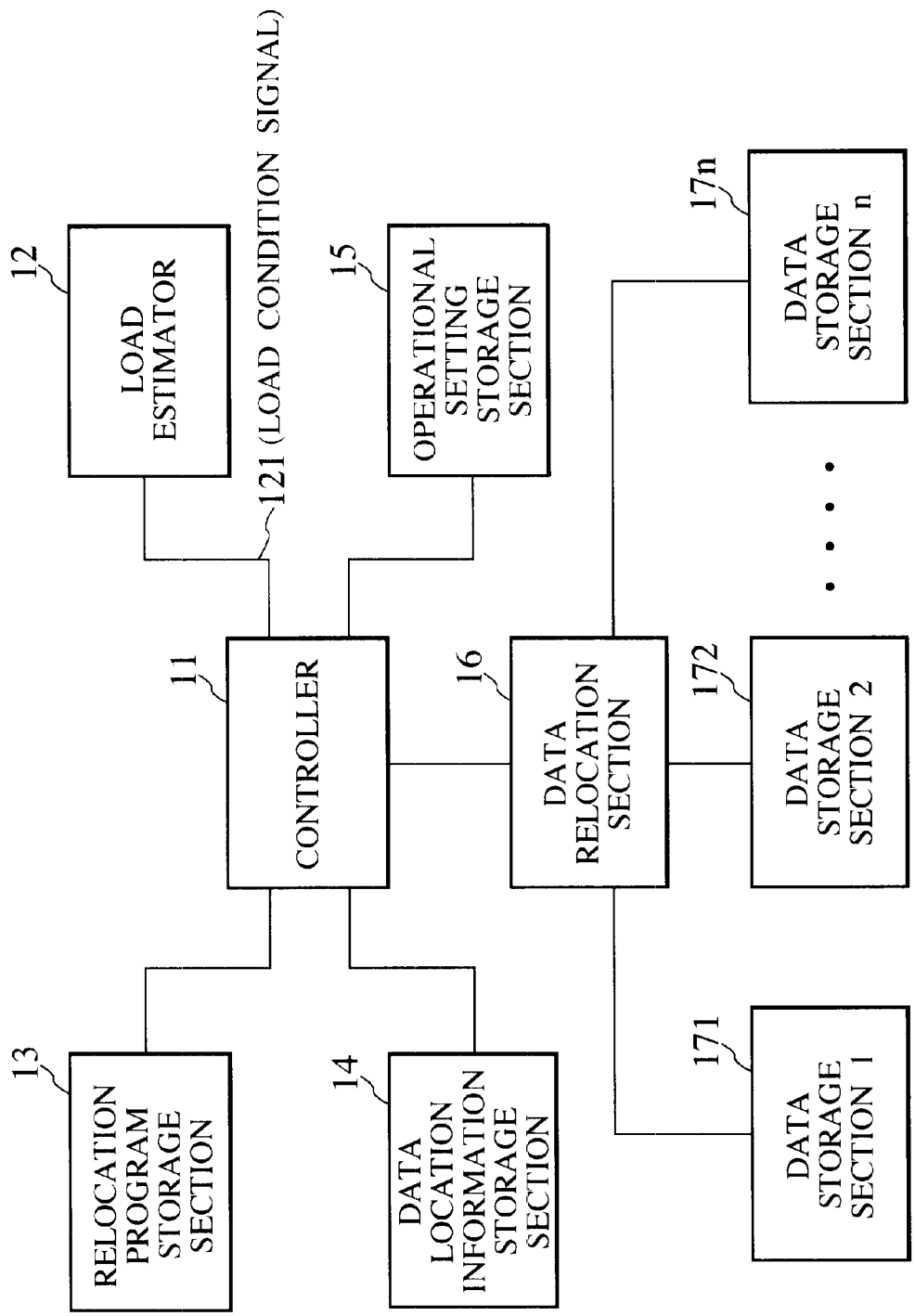
FIG. 6 is a block diagram showing the functional structure of a data storage system according to the second embodiment of the present invention.

FIG. 6 is a block diagram showing the structure of a data storage system according to the second embodiment. The data storage system of this embodiment differs from that (in FIG. 1) of the first embodiment from the aspect that the system of this embodiment includes a plurality of data storage sections 171 to 17n. The data storage sections 171 to 17n may be identical with each other, however, it is not required to be the same.

Figure 7:
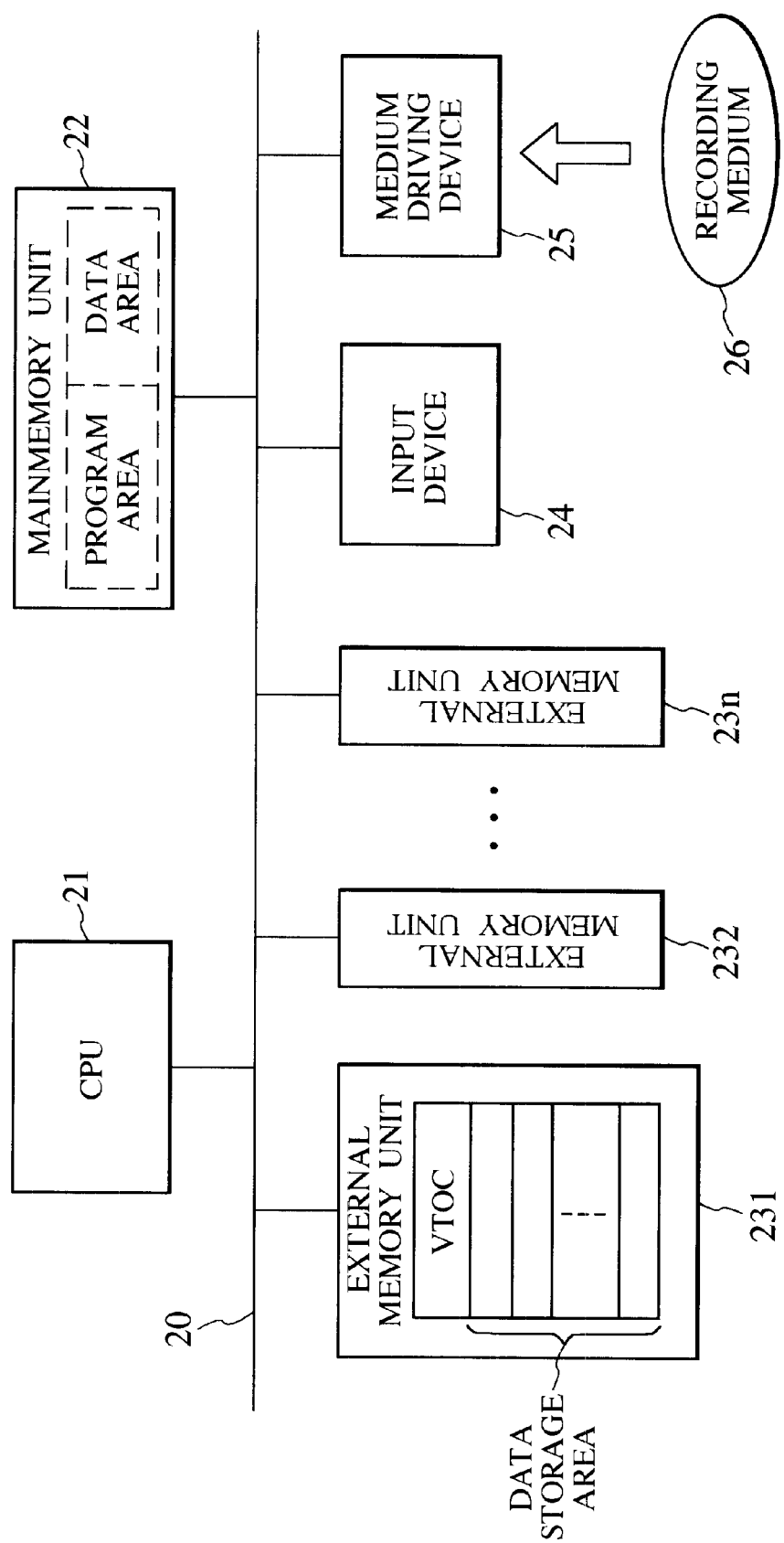
FIG. 7 is a block diagram exemplifying a computer system in which the data storage system shown in FIG. 2 is realized.

FIG. 7 is a block diagram showing the structure of a computer system, in which the data storage system shown in FIG. 1 is realized. The computer system is nearly the same as that shown in FIG. 2, however, it differs from the system of the first embodiment from the aspect that the computer system of this embodiment includes a plurality of external memory unit 231 to 23n.

The external memory units 231 to 23n are each composed of a magnetic disk unit, a magnetic tape unit and the like, and each has a data storage area for storing data in the unit of blocks and an area for storing file management information such as VTOC, etc. The external memory units 231 to 23n respectively realize the aforementioned data storage sections 171 to 17n, however, they may physically, separately, and/or logically be handled as different units.

In the computer system of this embodiment, the main memory unit 22 stores, in its data area, location information based on the file management information which are respectively stored in the external memory units 231 to 23n, and realizes the data location information storage section 14.

An explanation will be made, again based on FIG. 6. The data storage sections 171 to 17n include (1) those units (hereinafter referred to as primary data storage units), into which data are written from data writing units (not illustrated) in accordance with an instruction from the controller 11, and (2) those units (hereinafter referred to as secondary data storage units), into whose continuous blocks identical data stored in the primary data storage units and relocated by the data relocation section 16 are written.

In the data storage system according to this embodiment, the relocation program storage section 13 stores either one or more than one of a program (1) for relocating data in the respective data storage sections 171 to 17n, a program (2) for relocating data in the unit of the data storage sections 171 to 17n as a whole and a program (3) for relocating data in the unit of groups of data storage sections 171 to 17n.

Accordingly, the data storage system of this embodiment has the plurality of data storage sections 171 to 17n. Thus, in a case where a large volume of continuous data, particularly like image data, are simultaneously recorded and reproduced, a high cost performance system can be structured using one type of data storage section 171 to 17n as the primary data storage units and another type of data storage sections 171 to 17n as the external memory units. The data storage sections 171 to 17n as the primary data storage units are realized with employing a unit such as a magnetic disk unit, etc. which is operated at high speed and is relatively expensive, whereas the data storage sections 171 to 17n as the external memory units are realized with employing a unit such as a magnetic tape unit, etc. which is inexpensive, operated relatively at low speed and easily handled.

Procedures carried out in the data storage system according to this embodiment are almost the same as those in the first embodiment. However, in the case of the process of data relocation, the controller 11 selects a relocation program stored in the relocation program storage section 13 and controls the data relocation section 16 to carry out the relocation process. Even if a requirement of suspension (Step S5) is fulfilled while carrying out the relocation process, the process can go on without any suspension in a case where the system has the processing capability to perform further operations, for example in the case where a read/write operation is performed only to a piece of data. In the case of suspension, a completion process, in which data location information is written in the data location information storage section 14, is performed so that the data which has been relocated halfway through can be read again.

If the process for relocating data is performed under the circumstance where the data storage sections 171 to 17n are handled as a whole or the data storage sections 171 to 17n are handled in groups, the data can be relocated in such a way that a piece of continuous data is stored over in the plurality of data storage sections 171 to 17n. In the case where data forming a file is to be read, the data relocation section 16 may parallelly access the plurality of data storage sections.

As explained above, the data storage system according to this embodiment includes the plurality of data storage sections 171 to 17n. Those data storage sections 171 to 17n are divided into groups of two, namely the primary data storage units and the external memory units, therefore, the system whose cost performance is high can be structured.

The controller 11 selects the relocation program for controlling a piece of continuous data to be stored over in the plurality of data storage sections 171 to 17n, thus, the data relocation section 16 can simultaneously access the plurality of data storage sections 171 to 17n and can accelerate the speed at which the data is read out.

[Modifications]

In the above-described first and second embodiments, the load condition signal 121 functions for indicating the current load condition of the system and the estimated load condition within a given period of time. However, the load condition signal 121 may function for indicating either load condition of the two. Therefore, in the present invention, the data relocation section 16 may relocate the data stored in the data storage section 17, in accordance only with the current load condition of the system or only with the estimated load condition of the system.

Figure 3:
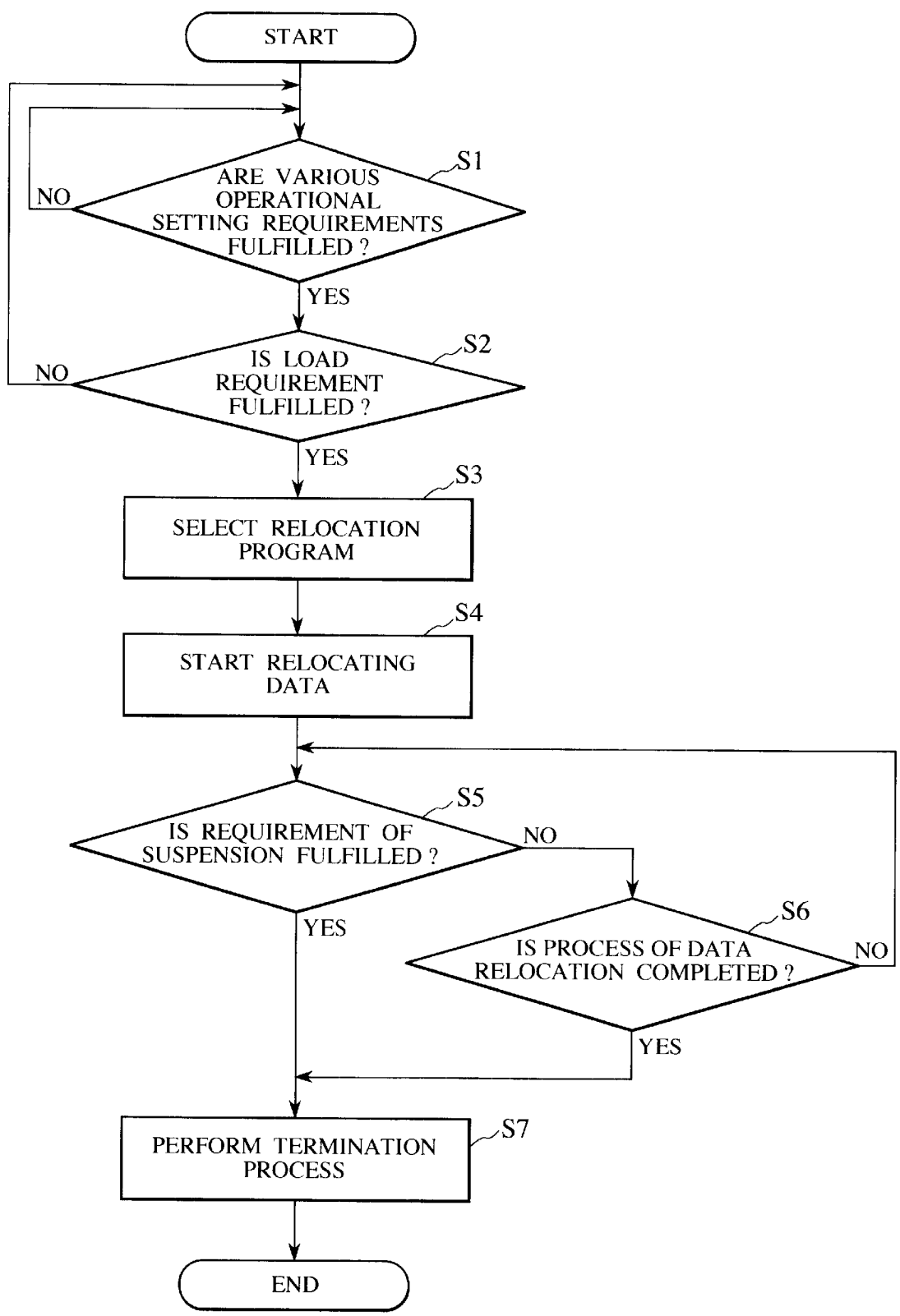
FIG. 3 is a flowchart showing a process of relocating data which a controller depicted in FIG. 1 carries out.

In the above-described first and second embodiments, the controller 11 performs context switching in a round-robin fashion, and time slices are allocated to the task of the flowchart shown in FIG. 3, thereby starting the process of the flowchart. However, the controller 11 may perform context switching in a priority order or in multiple queue, so that the priority order of the tasks of the flowchart shown in FIG. 3 may be lowered.

When the load on the system is large, system resources are not allocated for the task of the flowchart shown in FIG. 3, and the system resources can be allocated to any other task with efficiency. Even if the priority order of the task of the flowchart shown in FIG. 3 is set low, there is no such a case where the system resources assigned to the task of the flowchart shown in FIG. 3 are not allocated. This is because the load on the system is small and the number of tasks carried out by the controller 11 is not large, generally in a case where to relocate data.

In the above-described embodiments, the data storage system shown in FIG. 1 and 6 is realized in a single processor system shown in FIG. 2 and 7. However, realizing the data storage system shown in FIG. 1 in a multi-processor system is still within the scope of the present invention. For example, the controller 11, the load estimator 12, the data relocation section 15 may be respectively realized in various processors, instead of a single processor. In such a case, the programs executed by the processors may be stored in a local memory.

Figure 8:
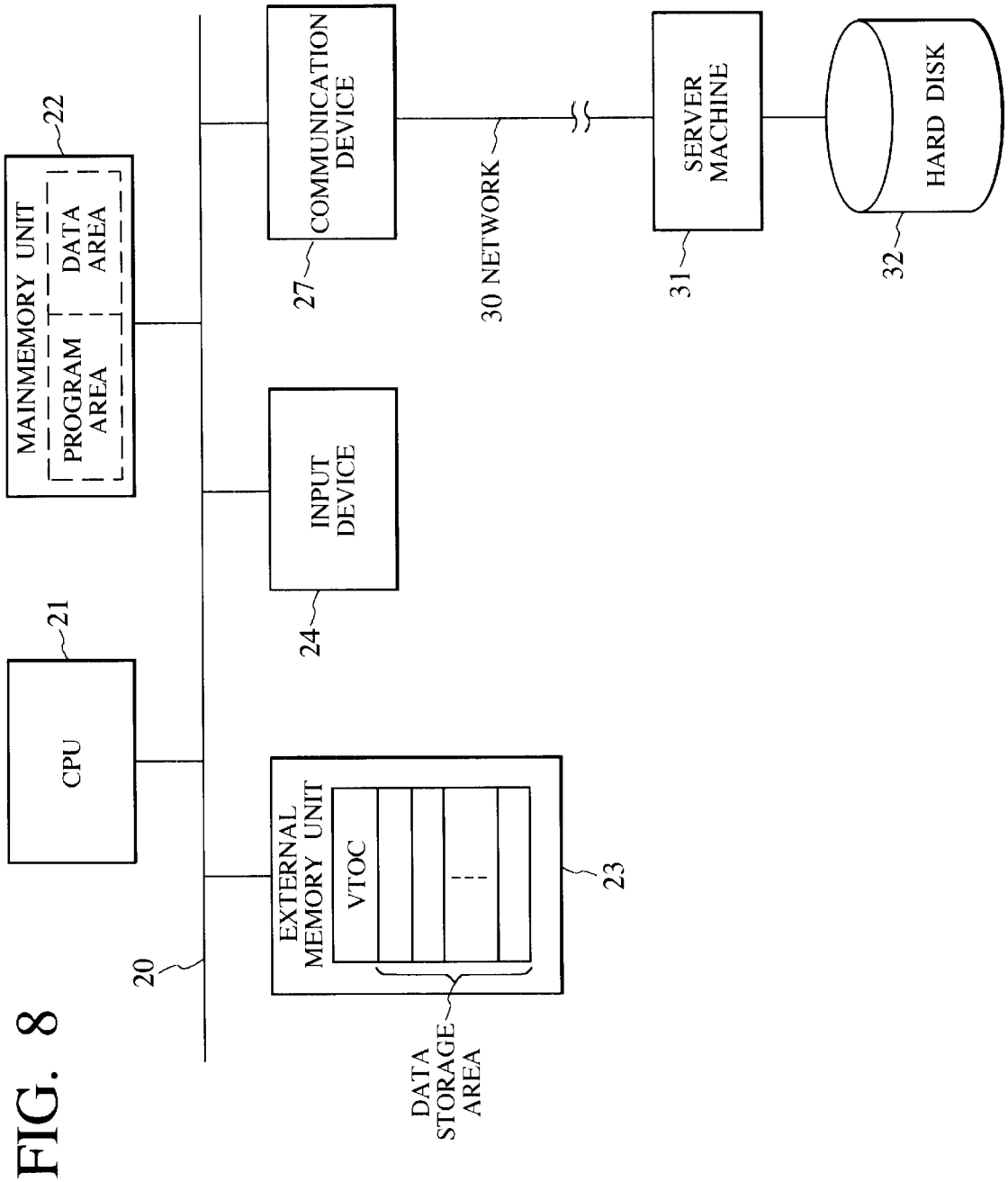
FIG. 8 is a block diagram exemplifying another computer system in which the data storage system shown in FIGS. 1 and 2 is realized.

In the above-described embodiments, the medium driving unit 25 reads out programs stored in the recording medium 26, and controls the read programs to be stored in the program area of the main memory unit 22. However, as illustrated in FIG. 8, the programs stored on a hard disk 32 included in a server machine 31 may be embodied in a carrier wave, and a communication device 27 may so receive the programs via a network 30 as to store the received programs in the program area of the main memory device 22.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. H10-338307 filed on Nov. 30, 1998 and including specification, claims, drawings and summary. The disclosure of the above Japanese Patent Application is incorporated herein by reference in its entirety.

What is claimed is:

1. A data storage system comprising:
    a data storage unit which has a data storage area divided into a plurality of blocks and which stores data in the data storage area in unit of blocks;
    a main memory unit which has a program area and a data area;
    a processing unit which executes programs stored in the main memory unit; and
    a relocation program storage unit which stores a plurality of relocation programs;
    wherein said main memory unit stores, in the data area, location information which represents in which block the data is located and stored in the data storage area of said data storage unit, and
    stores, in the program area, a relocation program for relocating a set of data stored in some blocks of the data storage area of said data storage unit into a continuous area by referring to the location information which is stored in the data area, a load condition output program for outputting a load condition signal indicating a load on a system resource including said data storage unit, and a control program for controlling whether to execute the relocation program in accordance with the output load condition signal, and the control program includes a relocation program selection program for selecting either one of relocation programs stored in the relocation program storage unit, when performing data relocation, and for starting the relocation program which has been selected by the relocation program selection program;
and said processing unit monitors the load condition signal which is output when executing the load condition signal output program, by executing the control program stored in the program area, and
executes the relocation program which is stored in the program area, in accordance with a monitored result of the load condition signal, at a timing at which a load on the system resource is lower than a reference load, by executing the control program stored in the program area.

2. The data storage system according to claim 1, wherein:
said data storage unit includes an area for storing location information which represents in which block data is located and stored in the data storage area;
the control program is one for transferring the location information stored in said data storage unit into the data area of said main memory unit, when executing the relocation program.

3. The data storage system according to claim 1, wherein:
said main memory unit further stores an operational setting requirement of the system in the data area; and
the control program includes an operational setting requirement determination program for determining whether a operating condition of the system meets the stored operational setting requirement, and controls execution of the relocation program in accordance with a determined result processed by the operational setting requirement determination program.

4. The data storage system according to claim 1, wherein the relocation program storage unit is realized with employing one or more than one data storage area included in said data storage unit.

5. The data storage system according to claim 1, wherein the relocation program selection program is one for selecting either one of relocation programs from the relocation program storage unit in accordance with the location information stored in the data area.

6. The data storage system-according to claim 1, wherein the relocation program selection program is one for selecting either one of relocation programs from the relocation program storage unit in accordance with the output load condition signal.

7. The data storage system according to claim 1, wherein the load condition signal output program includes a load condition monitoring program for monitoring a condition of a current load on a system resource, and is used for outputting a load condition signal in accordance with the load condition monitored by executing the load condition monitoring program.

8. The data storage system according to claim 1, wherein the load condition signal output program includes
    a load condition monitoring program for monitoring the load condition on the system resource, and
    a load condition learning program for learning the load condition monitored by execution of the load condition monitoring program and for storing the learned result as load condition estimation, and
    outputs a load condition signal in accordance with the load condition estimation stored by executing the load condition program.

9. The data storage system according to claim 1, wherein:

said processing unit executes a program in accordance with a priority order of a task; and a priority order of a task with regard to execution of the control program is set equal to or lower than a priority order of any other task.

10. The data storage system according to claim 1, comprising a plurality of data storage units each of which stores data in the data storage area in unit of blocks and each of which has a data storage area divided into a plurality of blocks, wherein said main memory unit stores, in the data area, location information regarding each of the plurality of data storage units.

11. The data storage system according to claim 10, wherein the relocation program is to relocate data which is stored in each of the blocks of the data storage area in the respective data storage units.

12. The data storage system according to claim 10, wherein the relocation program is to relocate the data stored in each block of the data storage area in groups of two or more than two data storage units.

13. The data storage system according to claim 12, wherein the relocation program is to relocate continuous data in such a way that the data is stored in groups of two or more than two data storage units.

14. A data storage system comprising:

data storage means, including a data storage area divided into a plurality of blocks, for storing data in the data storage area in unit of blocks;

location information storage means for storing location information representing in which block data is located and stored in the data storage area of the data storage means;

data relocation means for relocating a set of data stored in some blocks of the data storage area of said data storage means into a continuous area, by referring to the location information stored in said location information storage means;

load condition signal outputting means for outputting a load condition signal which indicates a load on a system resource including said data storage means;

control means for controlling said data relocation means in accordance with the load condition signal output from said load condition signal outputting means, at a timing at which a load on the system resource is lower than a reference load; and relocation method storage means for storing a plurality of data relocation methods with which said data relocation means can relocate data; and relocation method selection means for selecting either one of relocation methods from said relocation method storage means and for providing said data relocation means with the selected method, wherein said data relocation means relocates data in accordance with the relocation method which has been sent from said relocation method selection means.

15. The data storage system according to claim 14, further comprising:

operational setting requirement storage means for storing an operational setting requirement of the system comprising each of said means; and operational setting requirement determination means for determining whether a operating condition of the system meets the operational setting requirement stored in said operational setting requirement storage means, wherein said control means controls said data relocation means in accordance with a determined result performed by said operational setting requirement determination means.

16. A data relocation method for relocating data stored in a data storage unit including a data storage area divided into a plurality of blocks, in accordance with location information indicating a location of the data in the data storage area, wherein said method monitors a load condition signal indicating a load on a predetermined system resource including the data storage unit, relocates a set of data which are stored in some blocks of the data storage area of the data storage unit into a continuous area, in accordance with a monitored result of the load condition signal, by referring to the location information, at a timing at which a load on the system resource is lower than a reference load; and selects a relocation method from a plurality of relocation methods; and relocates data in accordance with the selected relocation method.

17. A computer readable recording medium which records programs for relocating data which is stored in a data storage unit including a data storage area divided into a plurality of blocks, in accordance with location information indicating a location of the data in the data storage area, said programs realizing on a computer:

a load condition signal monitoring function for monitoring a load condition signal which indicates a load on a predetermined system resource including the data storage unit;

a data relocation function for referring to the location information and for relocating the data stored in each block of the data storage area of the data storage unit, in accordance with a monitored result of the load condition signal which is processed by said load condition signal monitoring function, a relocation method function for selecting a relocation method from a plurality of relocation methods and relocating data in accordance with the selected relocation method.

18. A program embodied in a carrier wave, for relocating data stored in a data storage unit including a data storage area divided into a plurality of blocks in accordance with location information which indicates a location of the data in the data storage area, said program realizing, on a computer, a load condition signal monitoring function for monitoring a load condition signal which indicates a load on a predetermined system resource including the data storage unit; and a data relocation function for referring to the location information and relocating a set of data stored in some blocks of the data storage area of the data storage unit into a continuous area, in accordance with a monitored result of the load condition signal which is processed by said load condition signal monitoring function, at a timing at which a load on the system resource is lower than a reference load.

* * * * *